Dec. 4, 1934.  V. C. NORQUIST  1,982,924
FILTER SCREEN
Filed Oct. 22, 1932
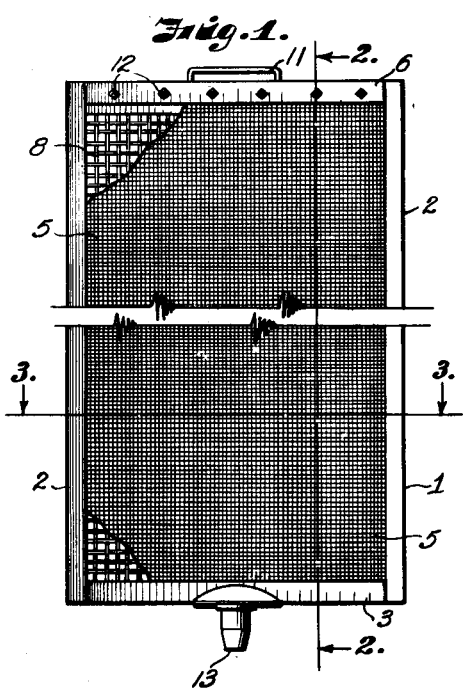
Fig. 1.
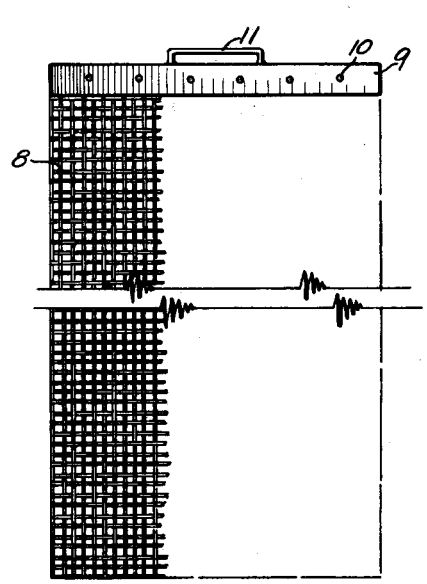
Fig. 4.
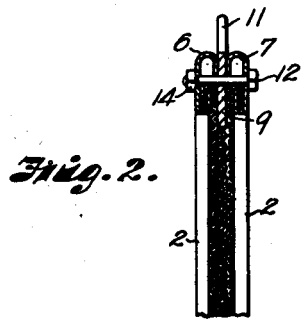
Fig. 2.
Fig. 3.
INVENTOR.
Victor C. Norquist
BY Thos. E. Scofield
ATTORNEY.

Patented Dec. 4, 1934

1,982,924

UNITED STATES PATENT OFFICE 1,982,924

FILTER SCREEN

Victor C. Norquist, Kansas City, Mo., assignor to Butler Manufacturing Company, Kansas City, Mo., a corporation of Missouri Application October 22, 1932, Serial No. 639,079

4 Claims. (Cl. 210—181)

My invention relates to a filter screen and more particularly to a filter screen having a removable core.

In certain types of filters, particularly those used for filtering cleaning fluid in connection with dry cleaning processes, a fine wire filter cloth is used. The filter cloth serves the purpose of forming a means for building up a filter cake. This filter cake is formed by adding a filter aid such as fuller's earth or some cellular material to the contaminated or soiled fluid which is to be filtered. In certain types of filters, a screen is employed in the form of a hollow member into which the filtered liquid passes through the screen. In certain types of filters, a pair of wire cloth screens is used. Inasmuch as the wire cloth is usually very fine, a coarse supporting screen or other supporting means is usually employed between the filtering or wire cloth screens to hold them apart and to prevent their contacting. After the filter has been in use for sometime, some of the filter aid will find its way into the interscreen space as will sludge and other foreign matter. To clean screen thus contaminated, it is necessary to wash the interscreen space clean. The performing of the washing operation will destroy the filter cake making it necessary to form a new filter cake on the filter screen layers.

One object of my invention is to provide a filter screen construction of the fluid screen type enabling it to be readily cleaned.

Another object of my invention is to provide a filter screen construction enabling the cleaning thereof without the destruction of the filter cake.

Other objects of my invention will appear from the following description.

In the accompanying drawing which forms part of the instant specification and which is to be read in conjunction therewith, and in which like reference numerals are used to indicate like parts in the various views;

Figure 1 shows a filter screen embodying one method of carrying out my invention with parts of the filtering screen broken away to show the removable supporting core.

Figure 2 shows a sectional view taken through the line 2—2 of Figure 1.

Figure 3 shows a sectional view taken through the line 3—3 of Figure 1.

Figure 4 shows an elevation of the removable core of my filter screen.

A suitable framework composed of side members 1 and 2 which are held in spaced relation by bottom member 3, supports filtering screens 4 and 5. A pair of top members 6 and 7 complete the frames to which filtering screens 4 and 5 are secured. The frame members are secured to each other in any suitable manner such as by welding. The screen members 4 and 5 are secured to the frames in any suitable manner such as by soldering. The filtering screens may be of any suitable wire cloth or made out of any suitable material. One example of a filter cloth which I employ is a 24 x 100 mesh Monel metal screen.

It will be observed as can be readily seen by reference to the accompanying drawing that the frame members and the filtering screens form an elongated rectangular compartment. Into this compartment I fit a core member which may be of any suitable construction. I may employ a coarse screen such as a 5½ mesh steel wire mining cloth screen suitably electrogalvanized as shown at 8. The upper portion of the core screen 8 terminates in a suspending bar 9 to which the core screen 8 is secured in any suitable manner. The top frame members 6 are provided with a series of bolt holes adapted to permit the passage of bolts therethrough. The core screen supporting member 9 is provided with a plurality of openings 10 adapted to be aligned with the openings in the top frame member 6. The screen supporting member 9 is provided with a suitable handle 11. When assembled as shown in Figure 1, the core screen 8 is housed within the compartment formed by the frame members and the filtering screens 4 and 5. A plurality of bolts 12 securely clamp the supporting member to the top frame members 6 and 7 as can be readily seen by reference to Figure 2. The bottom frame member 3 is provided with a suitable outlet drain 13 through which the filtered fluid passes from the filter after having been filtered by passage through the filtering screens 4 and 5 and the filter cake which is built up thereon. The bolts 12 are provided with nuts 14 enabling their removal.

It is to be understood that, while I have shown nuts and bolts as a means for securing the supporting member 9 to the top frame members 6 and 7, that any suitable securing means may be employed.

After the filter has been in use for a period of time, it becomes contaminated and it is desired to clean the same; all that is necessary to do is to open the filter top and remove the filter screen assemblies therefrom by grasping handles 11. The entire assembly is thus removed from the filter casing. The nuts 14 are then removed and the core taken out together with the dirt which accumulates therein. The core being thoroughly washed is replaced and the bolts again secured by nuts 14. If desired, the nuts 14 may be removed while the filter screens are in place in the filter. The bolts 12 are then taken out and the cores alone are removed through the means of handle 11. After cleaning, the cores are replaced and the bolts and nuts replaced to form the assembly.

It will be appreciated that I have accomplished the objects of my invention. I am enabled to readily clean the filter screens and especially the interscreen space in an expeditious and convenient manner.

It will be understood that certain features and sub-combinations are of utility and may be employed without reference to other features and sub-combinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention, what I claim is:

1. A filter screen assembly comprising in combination a frame, a pair of filter screen members supported by said frame in spaced relation to one another and forming a hollow filter leaf, one side of said frame having a longitudinal opening, a core member of coarse screen wire carried by said frame and removable as a unit from the inter-screen space, and an outlet for the filtered liquid from said inter-screen space.

2. A filter screen assembly comprising in combination a frame, a pair of filter screen members supported by said frame in spaced relation to one another and forming a hollow filter leaf, a passage through one side of the frame, a unitary core member positioned between said screen members, means to permit the core member to be removed from the inter-screen space as a unit through said passage without disturbing the spaced relation of the filter screen, and an outlet for the filtered liquid from said inter-screen space.

3. A filter screen assembly comprising a pair of filter screens, a frame for supporting said screens in spaced relation, said frame having a passage through one side thereof, said screens and said frame forming a hollow filter leaf, a unitary coarse screen core member positioned between the screens and removable through said passage without disturbing the spaced relation of the filter screens, and an outlet for the filtered liquid from the inter-screen space.

4. A filter screen assembly comprising a pair of filter screens, a frame for supporting said screens in spaced relation, said frame having a passage through one side thereof, said screens and said frame forming a hollow filter leaf, a single perforated core member positioned between the screens and removable as a unit through said passage without disturbing the spaced relation of the filter screens, and an outlet for the filtered liquid from the inter-screen space.

VICTOR C. NORQUIST.